US008589515B2

(12) United States Patent
Johnson et al.

(10) Patent No.: US 8,589,515 B2
(45) Date of Patent: Nov. 19, 2013

(54) AGGREGATED WIDGET REQUEST PROCESSING

(75) Inventors: David P. Johnson, Cary, NC (US);
Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/840,780

(22) Filed: Jul. 21, 2010

(65) Prior Publication Data
US 2012/0023200 A1    Jan. 26, 2012

(51) Int. Cl.
*G06F 15/16*    (2006.01)

(52) U.S. Cl.
USPC .......................................... 709/219; 709/217

(58) Field of Classification Search
USPC .................................................. 709/219, 217
See application file for complete search history.

(56) References Cited

U.S. PATENT DOCUMENTS

| | | | |
|---|---|---|---|
| 5,806,080 A | 9/1998 | Purple et al. | |
| 5,861,885 A | 1/1999 | Strasnick et al. | |
| 7,269,792 B2 * | 9/2007 | Consolatti et al. | 715/749 |
| 8,180,828 B2 * | 5/2012 | Macken | 709/203 |
| 2002/0149619 A1 * | 10/2002 | Sauer | 345/762 |
| 2005/0120076 A1 * | 6/2005 | Kamata et al. | 709/203 |
| 2006/0143293 A1 * | 6/2006 | Freedman | 709/225 |
| 2008/0086736 A1 * | 4/2008 | Timmons | 719/314 |
| 2008/0215998 A1 * | 9/2008 | Moore et al. | 715/762 |
| 2008/0222613 A1 * | 9/2008 | Allen et al. | 717/128 |
| 2008/0228429 A1 * | 9/2008 | Huang et al. | 702/141 |
| 2008/0294751 A1 * | 11/2008 | Dreiling | 709/219 |
| 2008/0295006 A1 * | 11/2008 | LuVogt et al. | 715/764 |
| 2009/0055430 A1 * | 2/2009 | Castro et al. | 707/102 |
| 2009/0094339 A1 * | 4/2009 | Allen et al. | 709/206 |
| 2009/0248883 A1 * | 10/2009 | Suryanarayana et al. | 709/229 |
| 2009/0249321 A1 * | 10/2009 | Mandyam et al. | 717/171 |
| 2009/0276835 A1 * | 11/2009 | Jackson et al. | 726/4 |
| 2010/0027527 A1 * | 2/2010 | Higgins et al. | 370/351 |
| 2011/0179145 A1 * | 7/2011 | Ravichandran et al. | 709/219 |

FOREIGN PATENT DOCUMENTS

| | | | |
|---|---|---|---|
| EP | 1986143 A1 * | 10/2008 | |
| EP | 2192474 A2 * | 6/2010 | |
| EP | 2200316 A1 * | 6/2010 | |
| WO | WO 2008109761 A2 * | 9/2008 | |
| WO | WO 2008130932 A1 * | 10/2008 | |
| WO | WO 2009018021 A1 * | 2/2009 | |

OTHER PUBLICATIONS

Ayman Ammoura, Dive-On: From Databases to Virtual Reality, Article: ACM Crossroads, Mar. 2001, pp. 1-15, vol. 7, Issue 3, Association for Computing Machinery, New York, NY, USA.

(Continued)

*Primary Examiner* — Wing F Chan
*Assistant Examiner* — Kostas Katsikis
(74) *Attorney, Agent, or Firm* — Lee Law, PLLC; Christopher B. Lee

(57) ABSTRACT

Each of a group of visible widgets are registered by an aggregated widget request processing module for aggregated data request processing. It is determined that an aggregated data update event associated with at least one of the registered visible widgets has occurred. Data associated with the aggregated data update event is obtained from a server. The data is distributed among the group of visible widgets based upon an aggregated data distribution profile.

24 Claims, 9 Drawing Sheets

(56) References Cited

OTHER PUBLICATIONS

Cyril Concolato, Jean Le Feuvre, Kyungmo Park, An MPEG-based Widget System for CE and Mobile Devices, Article: 2009 International Conference on Consumer Electronics (ICCE), IEEE Xplore, Jan. 2009, pp. 1-2, IEEE Computer Society, Las Vegas, NV, USA.

Mark Derthick, Steven F. Roth, Example-Based Generation of Custom Data Analysis Appliances, Proceedings of the 6th International Conference on Intelligent User Interfaces, Jan. 2001, pp. 57-64, Association for Computing Machinery, New York, NY, USA.

* cited by examiner

AGGREGATED WIDGET REQUEST PROCESSING

BACKGROUND

The present invention relates to widgets. More particularly, the present invention relates to aggregated widget request processing.

BRIEF SUMMARY

A method includes registering, via an aggregated widget request processing module, each of a plurality of visible widgets for aggregated data request processing; determining that an aggregated data update event associated with at least one of the registered visible widgets has occurred; obtaining data associated with the aggregated data update event from a server; and distributing the data among the plurality of visible widgets based upon an aggregated data distribution profile.

A system includes a communication module; and a processor programmed to register each of a plurality of visible widgets for aggregated data request processing; determine that an aggregated data update event associated with at least one of the registered visible widgets has occurred; obtain data associated with the aggregated data update event from a server via the communication module; and distribute the data among the plurality of visible widgets based upon an aggregated data distribution profile.

A computer program product comprising a computer readable storage medium including computer readable program code, where the computer readable program code when executed on a computer causes the computer to register, via an aggregated widget request processing module, each of a plurality of visible widgets for aggregated data request processing; determine that an aggregated data update event associated with at least one of the registered visible widgets has occurred; obtain data associated with the aggregated data update event from a server; and distribute the data among the plurality of visible widgets based upon an aggregated data distribution profile.

DETAILED DESCRIPTION

Figure 1:
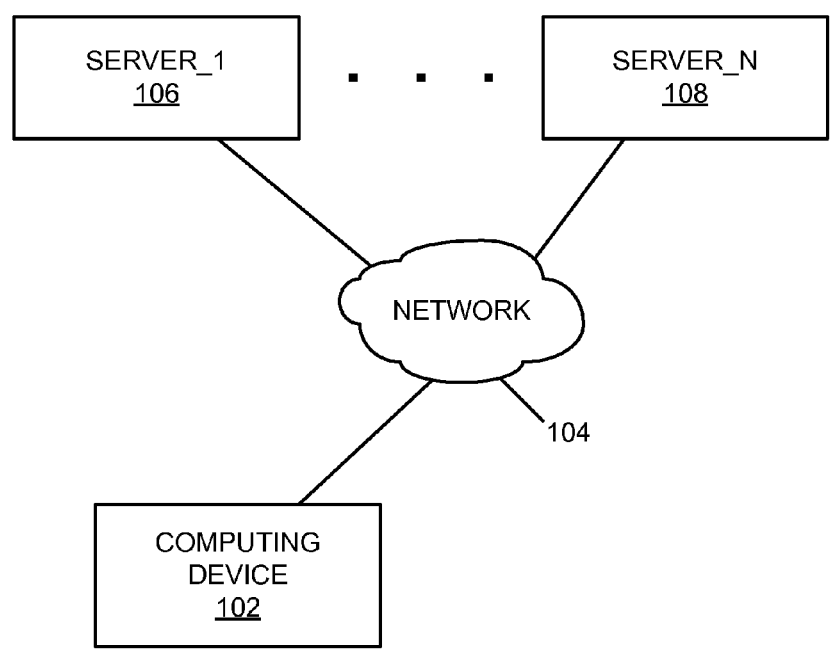
FIG. 1 is a block diagram of an example of an implementation of a system for aggregated widget request processing according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides aggregated widget request processing. The aggregated widget request processing may be performed by an aggregated widget request processing module. The aggregated widget request processing module provides a widget data interface for displayed visible widgets. As such, the aggregated widget request processing module operates as an invisible data widget that provides aggregated widget data request processing to visible widgets displayed via a computing device. The aggregated widget request processing module may be alternatively referred to herein as a request aggregating widget (RAW) and provides a graphical user interface (GUI) output for certain information, such as message trace and statistics, as described in more detail below. The aggregated widget request processing module stores and manages data profiles for the visible widgets and serves visible widget's data needs. Visible widgets register with the aggregated widget request processing module and provide their data update criteria to the aggregated widget request processing module at the time of registration (or re-registration if a change in the data update criteria is to be made). An aggregated data distribution profile is created, either for each registered visible widget or as a single profile including entries associated with each visible widget. The aggregated data distribution profile(s) define timing associated with data updates for the visible widgets and data distribution among the registered visible widgets in response to aggregated data request events. The aggregated widget request processing module may also change the service options of the visible widgets and may provide a visual display of internal operations of data flows to the visible widgets via a statistics and editing mode.

A standard known as "iWidget" defines user interface widget component interfaces and provides for consistent service interfaces between widgets. The aggregated widget request processing module may implement an iWidget interface that manages asynchronous Javascript® and extensible markup language (XML) (collectively AJAX) calls to retrieve data for business service management (BSM) Tivoli® iWidgets, such as IBM® Tivoli® composite application manager (ITCAM), IBM® Tivoli® monitoring (ITM), Tivoli® business systems manager (TBSM), and Tivoli® application dependency discovery manager (TADDM). It should be noted that while the present description presumes availability of the iWidget, or similar standard, the present subject matter may be applied to any widget-based implementation without departure from the scope of the present subject matter.

The aggregated widget request processing module provides a proxy interface for the visible widgets. As such, the visible widgets do not use AJAX calls directly to a server. To provide the data processing needs of the visible widgets, the aggregated widget request processing module identifies and responds to aggregated data request events to trigger data retrieval from one or more servers from which the data used to fulfill the data needs of the visible widgets may be obtained. As such, the aggregated widget request processing module performs aggregated data requests, such as aggregated AJAX calls, on behalf of the visible widgets, and may be considered a proxy for the displayed visible widgets. The aggregated widget request processing module also forms a foundation from which to provide batched requests to a host server for performance improvement. Accordingly, server communications may be reduced and servers may interface with fewer widgets.

The aggregated widget request processing module may provide a view console option (e.g., an analysis module) via the statistics and editing mode to see the registered visible widgets and to trace internal functionality of both the visible widgets and the aggregated widget request processing module. The view console option provides aggregated data update event tracking with statistical feedback and message flow tracing. A developer or user may view the statistical feedback and message flow tracing to determine performance improvements using the aggregated widget request processing module.

A visible widget may use a registration message to register with the aggregated widget request processing module for data services. The registration message may include an event name and a payload. The event name may identify an event that is already registered with the aggregated widget request processing module or may identify a new event. The payload may identify a data query that identifies the data needed by the visible widget. This query may be utilized by the aggregated widget request processing module for aperiodic or periodic page updates for the visible widgets.

For purposes of the present description, example event names that may be handled by the aggregated widget request processing module include a "GetData" event name for requesting data, a "Register" event name for registering or re-registering a visible widget with the aggregated widget request processing module, and an "Unregister" event name for unregistering a visible widget with the aggregated widget request processing module. The aggregated widget request processing module may also publish data to the respective visible widgets using an event name "SentData." It is also understood that the visible widgets may send data and query registration using events named "SendData" and "Registered." While the present example event names provide a framework within which to describe the present subject matter, other event names may be used as appropriate for a given implementation and all are considered within the scope of the present subject matter.

When the visible widgets are implemented as Tivoli® iWidgets, the registration message may include a registration message named "tivRegisterRAW" with an "eventName" parameter and a payload to register the iWidget with the aggregated widget request processing module at load time or at view time. The eventName may include a "tivGetData" event name. The payload may include, for example, an AJAX query that identifies the data needed by the iWidget for the user action (on demand). The eventName is registered by the aggregated widget request processing module and the aggregated widget request processing module retrieves the requested data and sends the retrieved requested data to all iWidgets registered for the same event with the same payload (e.g., query). Accordingly, data queries for multiple visible widgets may be aggregated and communications with the respective server(s) for data may be reduced.

The process of registering visible widgets for aggregated data services with the aggregated widget request processing module may be faced with a potential for a race condition when visible widgets are materialized on a displayed page, such as a web page, during an initialization of the aggregated widget request processing module. The following process may be employed by a visible widget that wants to register with the aggregated widget request processing module and to manage such a race condition. To obtain data at a visible widget from a host server, a process similar to the following data request procedure represented within pseudo code for a Tivoli® implementation may be executed.

```
If (notregistered){
    Send event tivRegisterRAW
    AJAX query to Host for data
}else{
    Send Event tivGetData
}
```

As such, the visible widget may obtain the requested data either via registration with the aggregated widget request processing module or, may retrieve the requested data directly from the host server if the aggregated widget request processing module has not yet been established or initialized.

The visible widget may be implemented to handle an event named "Registered" (e.g., tivRegistered for a Tivoli® implementation) that is sent by the aggregated widget request processing module when the visible widget is registered. The following pseudo code represents one possible implementation of processing for the "Registered" event for a Tivoli® implementation.

```
Handle_tivRegistered: function(event) {
    notregistered=false;
}
```

Using this example pseudo code, the visible widget may reset a "notregistered" flag for processing of subsequent requests via the data request procedure pseudo code described above. It is understood that the logic for the flag and equality may be inverted without departure from the scope of the present subject matter.

Accordingly, the two pseudo code examples above provide functionality by which the visible widget may check a flag to determine whether it has received an event from the aggregated widget request processing module indicating it has been registered for aggregated data processing, and the visible widget may try to register, and may also get the data directly from the host server and not go through the aggregated widget request processing module if that "Registered" event has not yet been received.

When a visible widget registers with the aggregated widget request processing module, a registration profile criterion is provided by the visible widget to allow the aggregated widget request processing module to establish both aggregated data update event criteria and data distribution criteria among the registered visible widgets. Four example profile criteria are provided below, however, it is noted that other criteria may be implemented and all such criteria are considered within the scope of the present subject matter.

A first example profile criterion is "None." Using the "None" criterion, the visible widget is registered with the aggregated widget request processing module to allow the aggregated widget request processing module to utilize the request data obtained by the registered visible widget for updating other visible widgets that are interested in that requested data without requesting data. As such, the "None" criterion may be considered a "Share Update" criterion. Further, the "None" criterion, indicates that this visible widget is not interested in being updated if other visible widgets are updated via an aggregated data request (i.e., not on par with other visible widgets).

A second example profile criterion is "OnPar." Using the "OnPar" criterion, the visible widget provides an indication to the aggregated widget request processing module to notify the aggregated widget request processing module that it wants to receive data update coincidentally (e.g., on par) with requests that may be issued by other visible widgets directed to the same data. As such, for example, a visible widget may register "OnPar" with another visible widget that has registered using the "None" profile criterion. Accordingly, when the visible widget that is registered with the "None" profile criterion is updated, the visible widget that is registered with the "OnPar" profile criterion will be updated coincidentally and in response to the data update for the visible widget registered with the "None" profile criterion.

A third example profile criterion is "Periodic." Using the "Periodic" criterion, the visible widget may be registered with the aggregated widget request processing module to allow the aggregated widget request processing module to periodically update the visible widget with requested data. The aggregated widget request processing module may maintain a single modulo timer with which to process and perform all periodic requests for all registered visible widgets. As such, internal complexity of the visible widgets may be reduced by relieving the individual visible widgets from managing update frequency, along with a reduction in a number of timers used to process periodic data requests by multiple visible widgets using a single modulo timer via the aggregated widget request processing module.

A fourth example profile criterion is "onParPeriodic." Using the "onParPeriodic" criterion, the visible widget may be registered with the aggregated widget request processing module as both an "OnPar" visible widget for data requests associated with other visible widgets, as well as a "Periodic" visible widget for periodic update of data independently of the on par update along with other visible widgets. Using the "onParPeriodic" profile criterion, a visible widget may be updated at its own periodicity and coincident with other visible widgets that share the same data.

Should a visible widget wish to change the query registered with the aggregated widget request processing module, the visible widget may change its internal "Notregistered" variable to TRUE and re-register using the example data requests procedure described above. The visible widget may further include a different profile criterion, such as one of those describe above. The aggregated widget request processing module may determine that the visible widget is already registered, but re-register the visible widget using the new profile criterion.

It should be noted that implementation of aggregated widget request processing module services within a visible widget may be performed with minimal changes to existing visible widget code. For example, the aggregated widget request processing module xhrGet( ) function may be used instead of a dojo.xhrGet( ) function. Further, two events may be added to the visible widget XML code to support aggregated widget request processing module services. Those two events are a "registered" event and a "send data" event. It is understood that a person of skill in the art may be able to implement such events within XML based code upon the description provided herein.

The following pseudo code provides one example of an implementation of a timer based upon the United States Naval Observatory Master Clock, and shows how to update an xhrGet( ) function.

```
dojo.declare("timer",rawservices,{
  onView:function( ){
    this.getData( );
  },
  loaddata: function(response,ioArgs){
    var element=dojo.query("[id=data]",
    this.iContext.getRootElement( ))[0];
    element.innerHTML=response;
  },
  getData: function( ){
    var wI = this;
    var widgetURL=
    this.iContext.io.rewriteURI("http://tycho.usno.navy.mil/cgibin/timer.pl");
    this.xhrGet({ url: widgetURL,
      handleAs: "text",
      timeout: 20000, //20 seconds
      profile: "Periodic",
      interval: 3, //every 15 seconds
      load: function(response, ioArgs)
      {
        wI.loaddata(response, ioArgs);
        return response;
      },
      error: function(response, ioArgs)
      {
        return response;
      }
    });
  }
});
```

As can be seen from the above pseudo code, a "timeout" variable and a "profile" variable have been established. The "timeout" variable is set to twenty (20) seconds with millisecond resolution. The "profile" variable is set to "Periodic" to cause update periodically at an interval of twenty seconds.

The aggregated widget request processing described herein may be performed in real time to allow prompt retrieval and distribution of data among multiple visible widgets. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for aggregated widget request processing. A computing device 102 communicates via a network 104 with a server_1 106 through a server_N 108.

As will be described in more detail below in association with FIG. 2 through FIG. 9, the computing device 102 provides automated aggregated widget request processing for multiple visible data widgets. The automated aggregated widget request processing is based upon and utilizes an aggregated widget request processing module that processes data requests for multiple visible widgets in an aggregated manner to reduce server communications and widget complexity. The automated aggregated widget request processing allows widgets to register for aggregated data processing utilizing registration messages that include registration profile criteria that specify data update/service requests and associations (e.g., sharing of data or references to data that another widget is registered to receive, such that the association is on par for data processing).

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 106 through the server_N 108 may include any device capable of providing data for consumption by a device, such as the computing device 102, via a network, such as the network 104. As such, the server_1 106 through the server_N 108 may each include a web server or other data server device.

Figure 2:
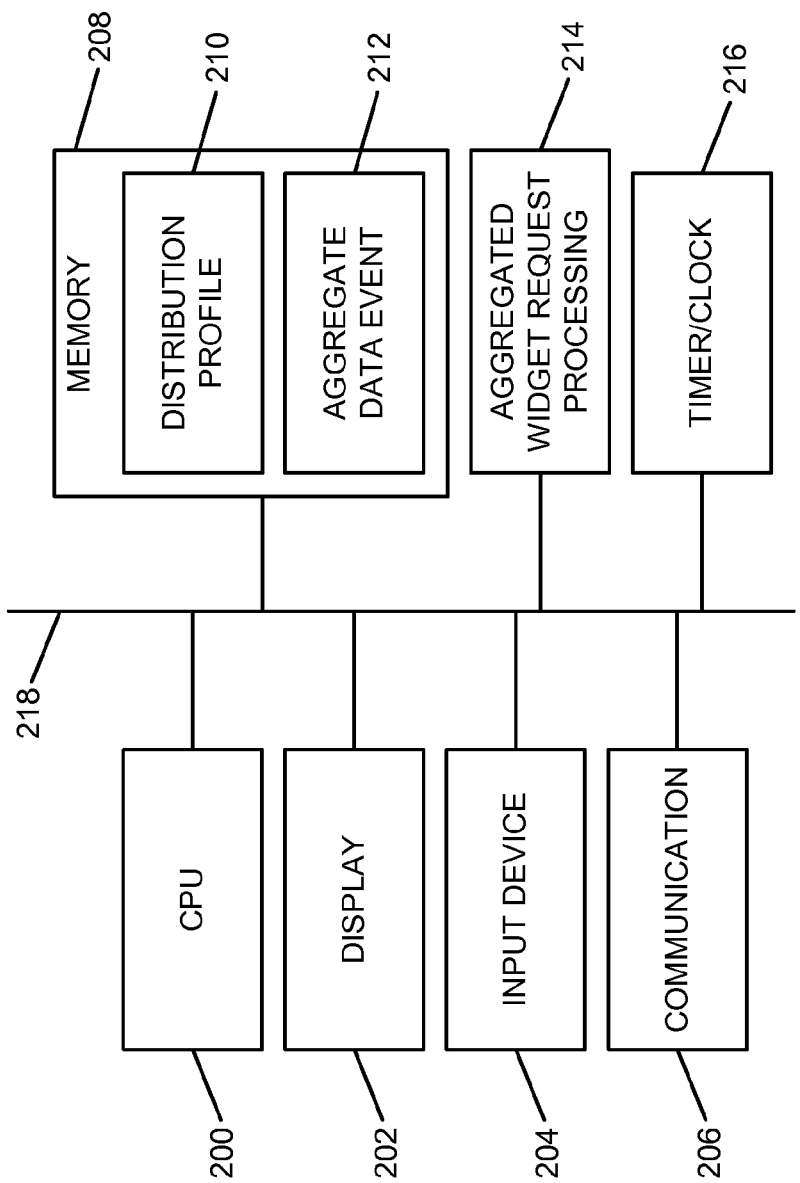
FIG. 2 is a block diagram of an example of an implementation of a computing device capable of performing automated aggregated widget request processing according to an embodiment of the present subject matter.

FIG. 2 is a block diagram of an example of an implementation of the computing device 102 capable of performing automated aggregated widget request processing. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

Figure 3:
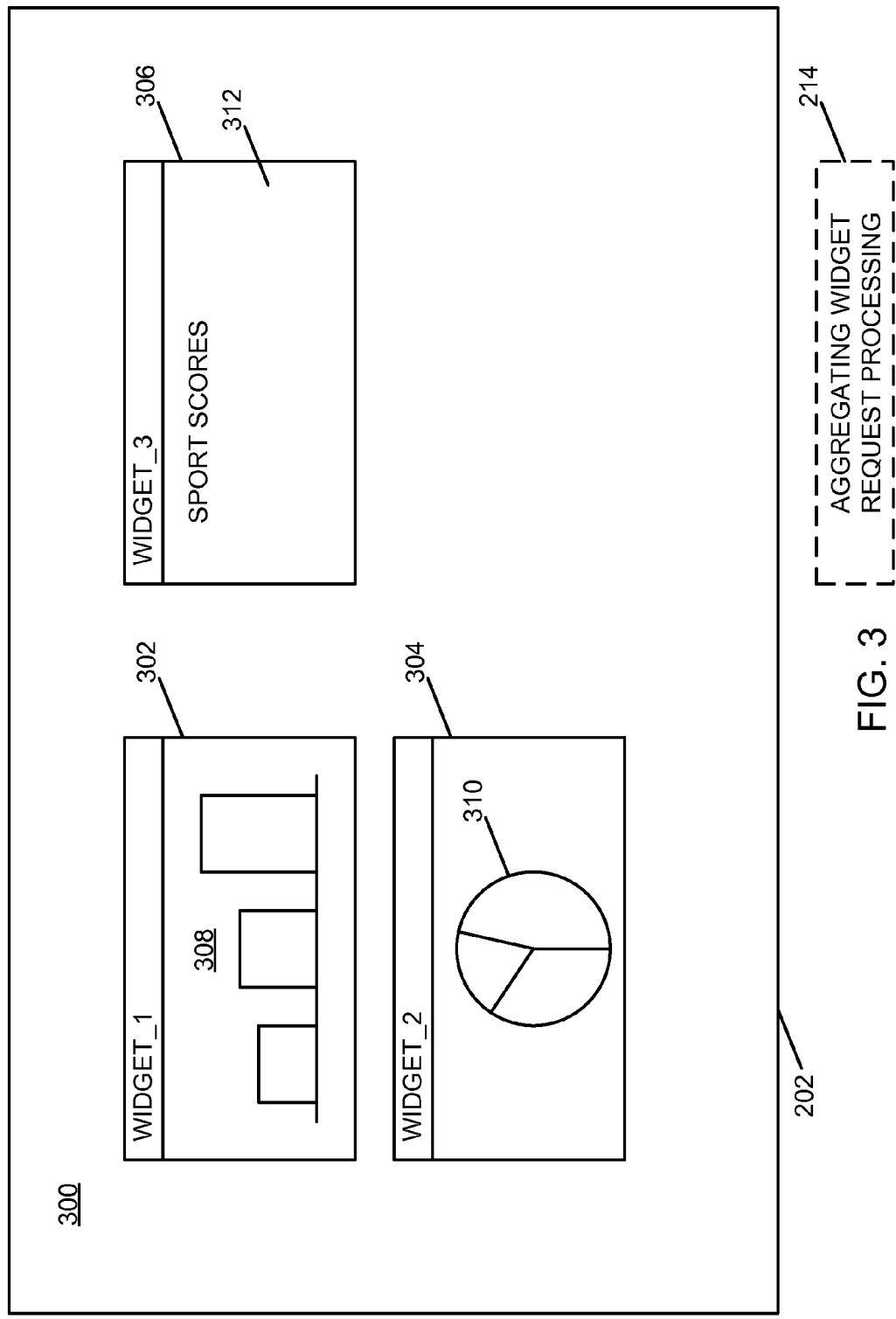
FIG. 3 is an illustration of an example of an implementation of a graphical user interface (GUI) for aggregated widget request processing for multiple displayed visible widgets according to an embodiment of the present subject matter.

A communication module 206 provides interconnection capabilities that allow the computing device 102 to communicate with other modules within the system 100, such as the server_1 106 through the server_N 108, to retrieve data for distribution to multiple visible widgets (see FIG. 3). The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a distribution profile storage area 210 that stores registration information and data distribution criteria for registered visible widgets associated with the computing device 102. As will be described in more detail below, registration information and data distribution criteria stored within the distribution profile storage area 210 is used to distribute data to visible widgets in response to aggregated data update events. The memory 208 also includes an aggregate data event storage area 212 that stores aggregated data update event information for processing via the computing device 102.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

An aggregated widget request processing module 214 is also illustrated. The aggregated widget request processing module 214 provides data update event aggregation, data retrieval, and data distribution for visible widgets associated with the computing device 102, as described above and in more detail below. The aggregated widget request processing module 214 implements the automated aggregated widget request processing of the computing device 102.

Though the aggregated widget request processing module 214 is illustrated as a component-level module for ease of illustration and description purposes, it should be noted that the aggregated widget request processing module 214 may include any hardware, programmed processor(s), and memory used to carry out the functions of this module as described above and in more detail below. For example, the aggregated widget request processing module 214 may include additional controller circuitry in the form of application specific integrated circuits (ASICs), processors, and/or discrete integrated circuits and components for performing communication and electrical control activities associated with the respective devices. Additionally, the aggregated widget request processing module 214 may also include interrupt-level, stack-level, and application-level modules as appropriate. Furthermore, the aggregated widget request processing module 214 may include any memory components used for storage, execution, and data processing for performing processing activities associated with the module.

It should also be noted that the aggregated widget request processing module 214 may form a portion of other circuitry described without departure from the scope of the present subject matter. Further, the aggregated widget request processing module 214 may alternatively be implemented as an application stored within the memory 208. In such an implementation, the aggregated widget request processing module 214 may include instructions executed by the CPU 200 for performing the functionality described herein. The CPU 200 may execute these instructions to provide the processing capabilities described above and in more detail below for the computing device 102. The aggregated widget request processing module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information for processing data requests. As such, the aggregated widget request processing module 214 may utilize information derived from the timer/clock module 216 for information processing activities, such as the aggregated widget request processing described herein. The timer/clock module 216 may be utilized to implement a modulo timer for aggregated widget request processing by the aggregated widget request processing module 214.

The CPU 200, the display 202, the input device 204, the communication module 206, the memory 208, the aggregated widget request processing module 214, and the timer/clock module 216 are interconnected via an interconnection 218. The interconnection 218 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device 102 are possible and all are considered within the scope of the present subject matter. Accordingly, the computing device 102 may take many forms and may be associated with many platforms.

FIG. 3 is an illustration of an example of an implementation of a graphical user interface (GUI) 300 for aggregated widget request processing for multiple displayed visible widgets. The display 202 is shown with the GUI 300 rendered. The GUI 300 includes a widget_1 302, a widget_2 304, and a widget_3 306. As can be seen from FIG. 3, the widget_1 302 displays a bar graph 308. The widget_2 304 displays a pie chart 310. The widget_3 306 displays a text pane 312 that may include, for example, sports scores.

As will be described in more detail below, the widget_1 302 and the widget_2 304 utilize the same data to display the bar graph 308 and the pie chart 310, respectively. As such, analysis of the data needs of the widget_1 302 and the widget_2 304 allows the aggregated widget request processing module 214 to reduce server communication, such as with the server_1 106, by aggregating the data needs of the widget_1 302 and widget_2 304 into a single data query. The aggregated widget request processing module 214 may then receive data in response to the single query and distribute it to the widget_1 302 and widget_2 304. Distribution of the data to the respective visible widgets may include copying the data for each visible widget to which the data is to be distributed and sending the copied data to each visible widget. As such, each widget may further modify or edit the data received without corrupting the data cached in association with the aggregated widget request processing module 214, such as within the memory 208.

The widget_3 306 data requirements are different from those of the widget_1 302 and widget_2 304. As such, the aggregated widget request processing module 214 may perform a separate query to fulfill the data needs of the widget_3 306.

It should be noted that the aggregated widget request processing module 214 is shown with a dashed-line representation within FIG. 3 to show that it is not a displayed visible widget. As described above and in more detail below, the aggregated widget request processing module 214 provides a user interface as a request aggregating widget in an analysis mode (see FIG. 9). The aggregated widget request processing module 214 provides a widget interface that complies with widget interface requirements within the GUI 300. However, the aggregated widget request processing module 214 is not a displayed widget other than in the editing mode. As such, the aggregated widget request processing module 214 may be considered an invisible or a hidden widget for messaging and interface purposes.

Figure 4:
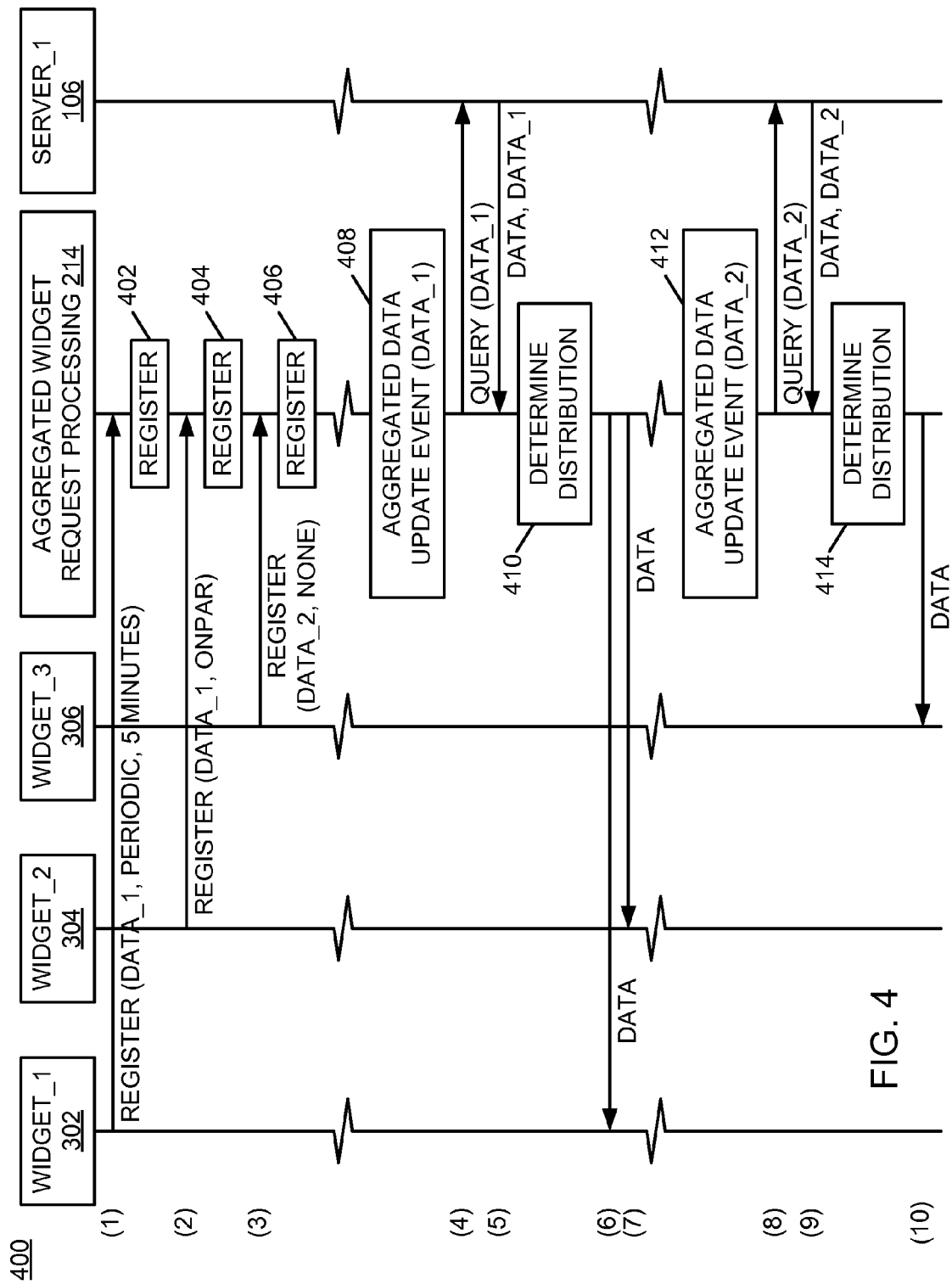
FIG. 4 is a message flow diagram of an example of an implementation of messaging for aggregated widget request processing in association with the example of FIG. 3 according to an embodiment of the present subject matter.

FIG. 4 is a message flow diagram 400 of an example of an implementation of messaging for aggregated widget request processing in association with the example of FIG. 3. Within the message flow diagram 400, the widget_1 302, the widget_2 304, and the widget_3 306 are illustrated along with the aggregated widget request processing module 214. The server_1 106 is also illustrated. For purposes of the present example, it is assumed that the data requirements of all three visible widgets 302, 304, and 306 may be served by the single server_1 106. However, it is understood that different servers may be utilized to retrieve different data as appropriate for a given implementation.

As can be seen within FIG. 4, the widget_1 302 sends a register message to the aggregated widget request processing module 214 (line 1). The register message includes an identification of the data requested by the widget_1 302, represented as "DATA_1" within the present example. The "DATA_1" identifier represents a query request for data identified by the "DATA_1" identifier. Any suitable identifier may be used.

The register message also includes a data request event criterion as described above. Within the present example, the data request event criterion of "Periodic" is used with a timing criterion of five (5) minutes. As such, the widget_1 302 is requesting to be registered with the aggregated widget request processing module 214 for periodic updates at 5 minute intervals for data represented by "DATA_1." In response to receipt of the register message from the widget_1 302, the aggregated widget request processing module 214 registers the widget_1 302 for aggregated widget request processing at block 402.

The widget_2 304 sends a similar register message to the aggregated widget request processing module 214 (line 2). The register message sent by the widget_2 304 includes the same data identifier "DATA_1." However, this register message includes a different data request event criterion. As can be seen within FIG. 4, the register message sent by the widget_2 304 includes an "OnPar" data request event criterion. As such, the widget_2 304 is requesting to be registered with the aggregated widget request processing module 214 to be updated coincidentally (e.g., on par) with any other visible widget that utilizes DATA_1. Within the present example, the widget_1 302 utilizes the same data. As such, the widget_2 304 may be updated at the same periodicity of 5 minutes, along with the widget_1 302. In response to receiving the register message from the widget_2 304, the aggregated widget request processing module 214 registers the widget_2 304 for aggregated widget request processing at block 404.

Similarly, the widget_3 306 sends a register message to the aggregated widget request processing module 214 (line 3). The register message sent by the widget_3 306 includes a data identifier of "DATA_2." As such, the data requested by the widget_3 306 is different from the data requested by the widget_1 302 and the widget_2 304. The register message sent by the widget_3 306 also includes a data request event criterion of "None." As such, the widget_3 306 provides an indication that it does not wish to be updated coincident with any other visible widget, but authorizes distribution of the data requested by the widget_3 306 to other visible widgets.

Within the present example, no other widget is illustrated for ease of illustration purposes. However, it is understood that if another visible widget was available and registered with the aggregated widget request processing module 214 with either an "OnPar," a "Periodic," or an "onParPeriodic" data request event criterion using the same data identifier as the widget_3 306, the aggregated widget request processing module 214 would perform similar processing for any such widget in association with retrieving data updates for the widget_3 306. In response to receiving the register message from the widget_3 306, the aggregated widget request processing module 214 registers the widget_3 306 for aggregated widget request processing at block 406.

Upon registration of one or more visible widgets, the aggregated widget request processing module 214 begins processing to determine whether any aggregated data update event has occurred. Further, if any registered visible widget has requested a periodic update of data, the aggregated widget request processing module 214 will also start a timer, such as a timer associated with the timer/clock module 216 described above. Within the present example, the widget_1 302 registered with a data request event criterion of "Periodic." As such, the aggregated widget request processing module 214 would further start at timer in association with registering the widget_1 302 at block 402.

At block 408, the aggregated widget request processing module 214 determines that an aggregated data update event has occurred in association with the data query identified by the data identifier "DATA_1." For purposes of the present example, it is the registration of the widget_1 302 with a periodic interval of 5 minutes that triggers the aggregated data update event at block 408. In response to the aggregated data update event, the aggregated widget request processing module 214 initiates a query based upon the data query identified by the identifier "DATA_1," such as an AJAX query, to the server_1 106 to retrieve the requested data (line 4). In response to receiving the query, the server_1 106 responds with the data identified within the query (line 5).

At block 410, the aggregated widget request processing module 214 determines a distribution for the received data. To determine the distribution, the aggregated widget request processing module 214 searches either a single distribution profile that represents the data needs of all registered visible widgets or searches individual distribution profiles created for each registered visible widget. As described above, the distribution profile(s) may be stored within the distribution profile storage area 210 for visible widgets that are registered with the data identifier "DATA_1." Within the present example, the aggregated widget request processing module 214 will identify that the widget_1 302 and the widget_2 304 are both registered to retrieve updates for the data identified by the data identifier "DATA_1." The aggregated widget request processing module 214 will also note that the widget_2 304 is registered with a data request event criterion of "OnPar." As such, the aggregated widget request processing module 214 distributes the data associated with the data identifier "DATA_1" to each of the widget_1 302 and the widget_2 304 (line 6 and line 7, respectively).

As a variation on the present example, it should be understood that the widget_2 304 may have registered with its own periodicity of update using, for example, the "Periodic" data request event criterion. In such a situation, the aggregated widget request processing module 214 may further determine at block 410 whether or not the widget_2 304 should be updated in response to the aggregated data update event associated with the widget_1 302. Within this variation on the example, the widget_2 304 would not be "on par" with the widget_1 302 and would only be updated coincidentally with the widget_1 302 if the two periodicities of the two visible widgets aligned to trigger the same aggregated data update event. It should further be noted that the aggregated widget request processing module 214 may use a single modulo timer to perform all aggregated widget request processing.

At block 412, the aggregated widget request processing module 214 determines that an aggregated data update event for the data identifier "DATA_2" has occurred. In response, the aggregated widget request processing module 214 issues a query with the data identifier "DATA_2" and sends it to the server_1 106 (line 8). In response to receiving the query, the server_1 106 may return the data identified by the query (line 9).

At block 414, the aggregated widget request processing module 214 determines a distribution of the data obtained from the server_1 106. Within the present example, the aggregated widget request processing module 214 determines that only the widget_3 306 is registered to receive the data identified by the data identifier "DATA_2." As such, the aggregated widget request processing module 214 sends the data identified by the data identifier "DATA_2" to the widget_3 306 (line 10).

As such, the message flow diagram 400 illustrates example processing for data request event criteria "Periodic," "OnPar," and "None." It is understood that similar processing may be performed for the data request event criterion "onParPeriodic." Within such an example, a visible widget registered with a data request event criterion of "onParPeriodic" may register to be updated with data on par with another registered visible widget and at its own periodicity independently of data updates associated with the other visible widget. As such, a visible widget registered as "onParPeriodic" may specify a default interval update, and may be updated at a different frequency (e.g., periodicity) than the other registered visible widget to provide consistency of displayed data.

Figure 5:
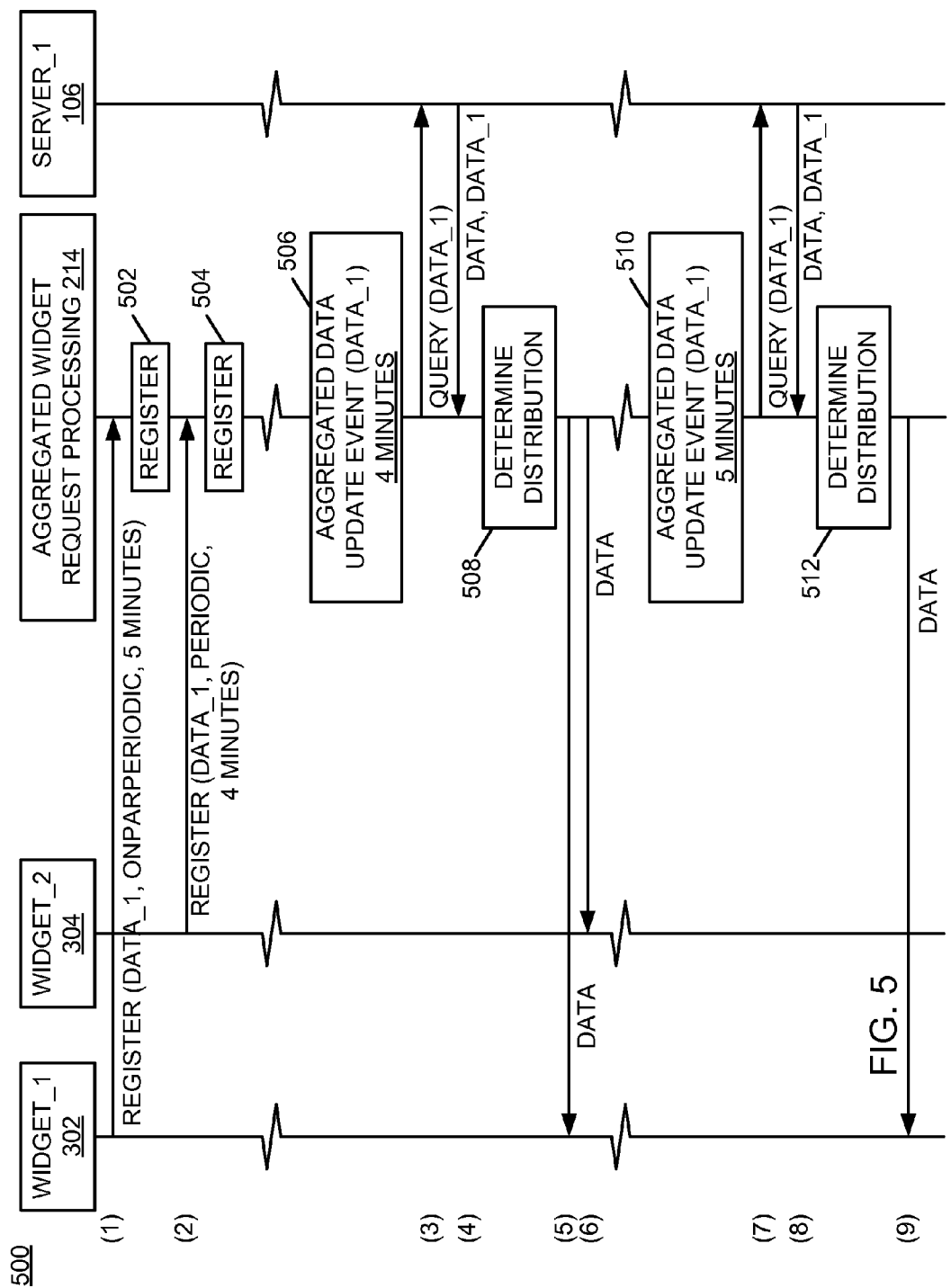
FIG. 5 is a message flow diagram of an example of an implementation of messaging for aggregated widget request processing including both on par periodic and periodic updates according to an embodiment of the present subject matter.

FIG. 5 is a message flow diagram 500 of an example of an implementation of messaging for aggregated widget request processing including both on par periodic and periodic updates. Within the present example, only the widget_1 302 and widget_2 304 are illustrated for brevity, along with the aggregated widget request processing module 214. The server_1 106 is also illustrated. For purposes of the present example, it is assumed that the data requirements of both visible widgets 302 and 304 may again be served by the single server_1 106. However, it is understood that different servers may be utilized to retrieve different data as appropriate for a given implementation.

As can be seen within FIG. 5, the widget_1 302 sends a register message to the aggregated widget request processing module 214 (line 1). The register message includes an identification of the data requested by the widget_1 302, represented as "DATA_1" within the present example. The "DATA_1" identifier represents a query request for data identified by the "DATA_1" identifier. Any suitable identifier may be used.

The register message also includes a data request event criterion as described above. Within the present example, the data request event criterion of "onParPeriodic" is used with a timing criterion of five (5) minutes. As such, the widget_1 302 is requesting to be registered with the aggregated widget request processing module 214 for periodic updates at 5 minute intervals for data represented by "DATA_1." The widget_1 302 is also requesting to be registered to receive any other updates associated with other registered visible widgets for data represented by "DATA_1." In response to receipt of the register message from widget_1 302, the aggregated widget request processing module 214 registers the widget_1 302 for aggregated widget request processing at block 502.

The widget_2 304 sends a similar register message to the aggregated widget request processing module 214 (line 2). The register message sent by the widget_2 304 includes the same data identifier "DATA_1." However, this register message includes a different data request event criterion. As can be seen within FIG. 5, the register message sent by the widget_2 304 includes a "Periodic" data request event criterion with a timing criterion of four (4) minutes. In response to receiving the register message from the widget_2 304, the aggregated widget request processing module 214 registers the widget_2 304 for aggregated widget request processing at block 504.

Upon registration of one or more visible widgets, the aggregated widget request processing module 214 begins processing to determine whether any aggregated data update event has occurred. Further, if any registered visible widget has requested a periodic update of data, the aggregated widget request processing module 214 will also start a timer, such as a timer associated with the timer/clock module 216 described above. Within the present example, the widget_1 302 registers first with a data request event criterion of "onParPeriodic." As such, the aggregated widget request processing module 214 would further start a timer in association with registering the widget_1 302 at block 502. As described above, the aggregated widget request processing module 214 may use a single timer operating in a modulo mode of operation for all timing requirements of the registered visible widgets. As such, the aggregated widget request processing module 214 does not need to start a second timer in response to registration of the widget_2 304 for periodic updates.

As an additional assumption for the present example, it is assumed that the widget_2 304 registers within less than a minute of the registration of the widget_1 302. As such, for purposes of the present example, the four (4) minute update of the widget_2 304 will occur prior to the five (5) minute update of the widget_1 302. Further, each registered visible widget may be timed for its periodic updates relative to the time of registration. As an alternative, the timing for update of registered visible widgets may be aligned so that, for example, at twenty (20) minutes of registration of the widget_1 302, each of the widget_1 302 and the widget_2 304 will have an aligned update time. Many variations on alignment of timing for update of registered visible widgets are possible and all are considered within the scope of the present subject matter.

At block 506, the aggregated widget request processing module 214 determines that an aggregated data update event has occurred in association with the data query identified by the data identifier "DATA_1." For purposes of the present example, it is the registration of the widget_2 304 with a periodic interval of 4 minutes that triggers the aggregated data update event at block 506. In response to the aggregated data update event, the aggregated widget request processing module 214 initiates a query based upon the data query identified by the identifier "DATA_1," such as an AJAX query, to the server_1 106 to retrieve the requested data (line 3). In response to receiving the query, the server_1 106 responds with the data identified within the query (line 4).

At block 508, the aggregated widget request processing module 214 determines a distribution for the received data. To determine the distribution, the aggregated widget request processing module 214 searches either a single distribution profile that represents the data needs of all registered visible widgets or searches individual distribution profiles created for each registered visible widget. As described above, the distribution profile(s) may be stored within the distribution profile storage area 210 for visible widgets that are registered with the data identifier "DATA_1." Within the present example, the aggregated widget request processing module 214 will identify that the widget_1 302 and the widget_2 304 are both registered to retrieve updates for the data identified by the data identifier "DATA_1." The aggregated widget request processing module 214 will also note that the widget_1 302 is registered with a data request event criterion of "onParPeriodic." As such, the aggregated widget request processing module 214 distributes the data associated with the data identifier "DATA_1" to each of the widget_1 302 and the widget_2 304 (line 5 and line 6, respectively).

At block 510, the aggregated widget request processing module 214 determines that another aggregated data update event for the data identifier "DATA_1" has occurred. Within the present example, this aggregated data update event is based upon expiration of five (5) minutes and the widget_1 302 being registered for a periodic update at five (5) minute intervals. In response, the aggregated widget request processing module 214 issues a query with the data identifier "DATA_1" and sends it to the server_1 106 (line 7). In response to receiving the query, the server_1 106 may return the data identified by the query (line 8).

At block 512, the aggregated widget request processing module 214 determines a distribution of the data obtained from the server_1 106. Within the present example, the aggregated widget request processing module 214 determines that only the widget_1 302 is registered to receive the data identified by the data identifier "DATA_1" at an interval of five (5) minutes. As such, the aggregated widget request processing module 214 sends the data identified by the data identifier "DATA_1" to the widget_1 302 (line 9).

As such, the message flow diagram 500 illustrates example processing for data request event criteria "onParPeriodic" and "Periodic." As can be seen from the example of FIG. 5, registered visible widgets may be updated in response to their own specified interval and on par with other registered visible widgets.

Figure 6:
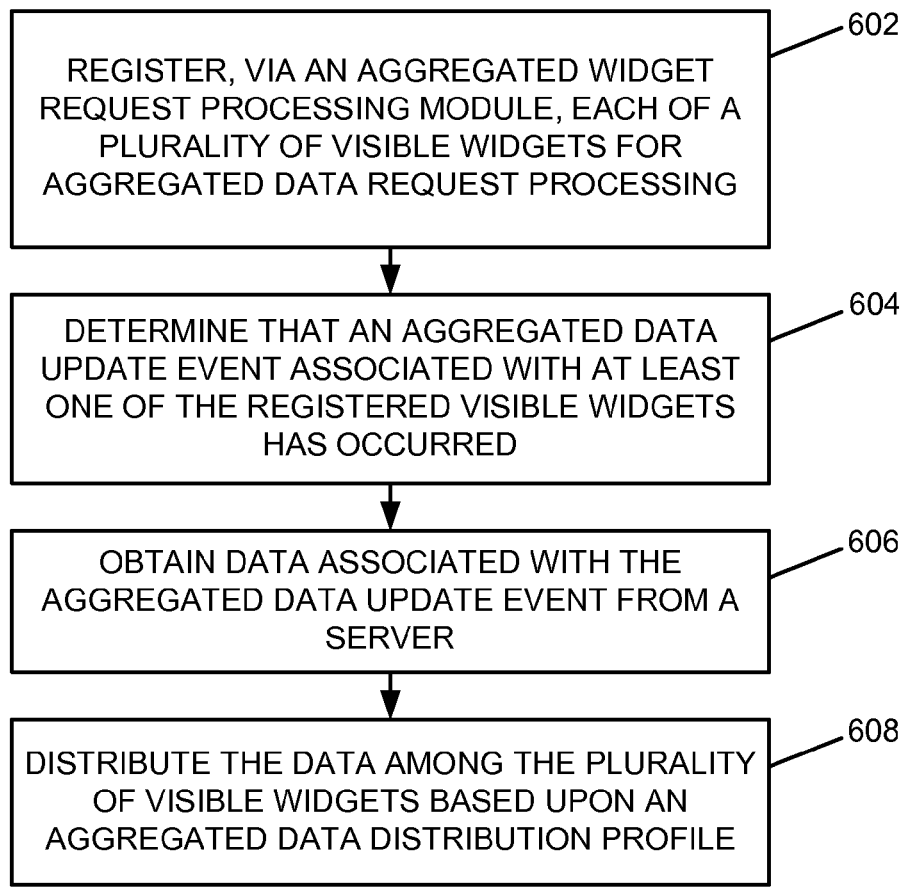
FIG. 6 is a flow chart of an example of an implementation of a process for automated aggregated widget request processing according to an embodiment of the present subject matter.
Figure 7:
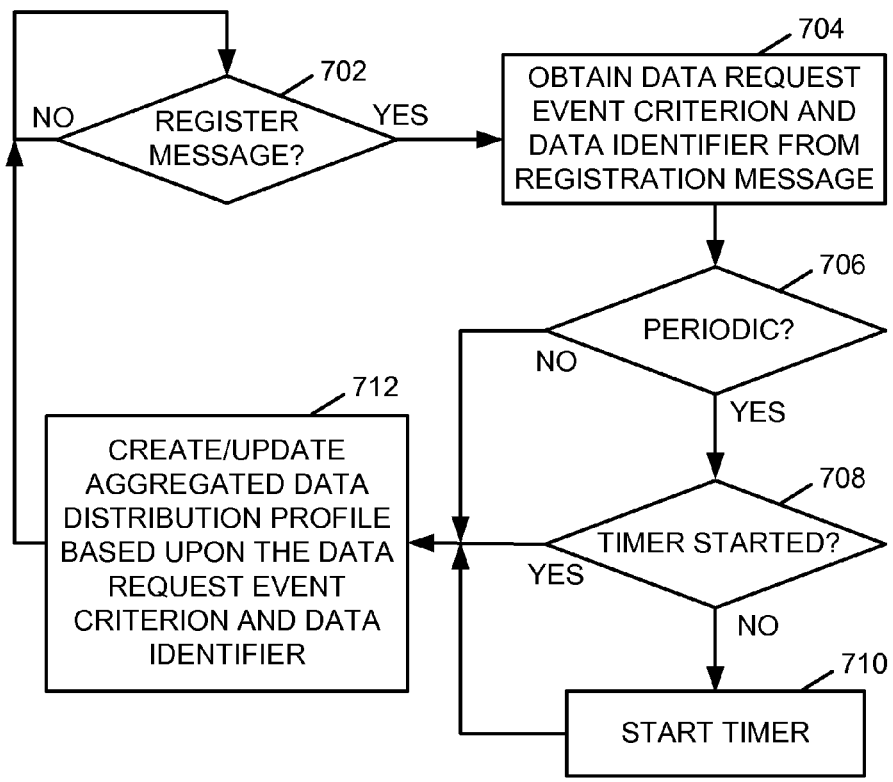
FIG. 7 is a flow chart of an example of an implementation of a process for registration of visible widgets for aggregated widget request processing according to an embodiment of the present subject matter.
Figure 8:
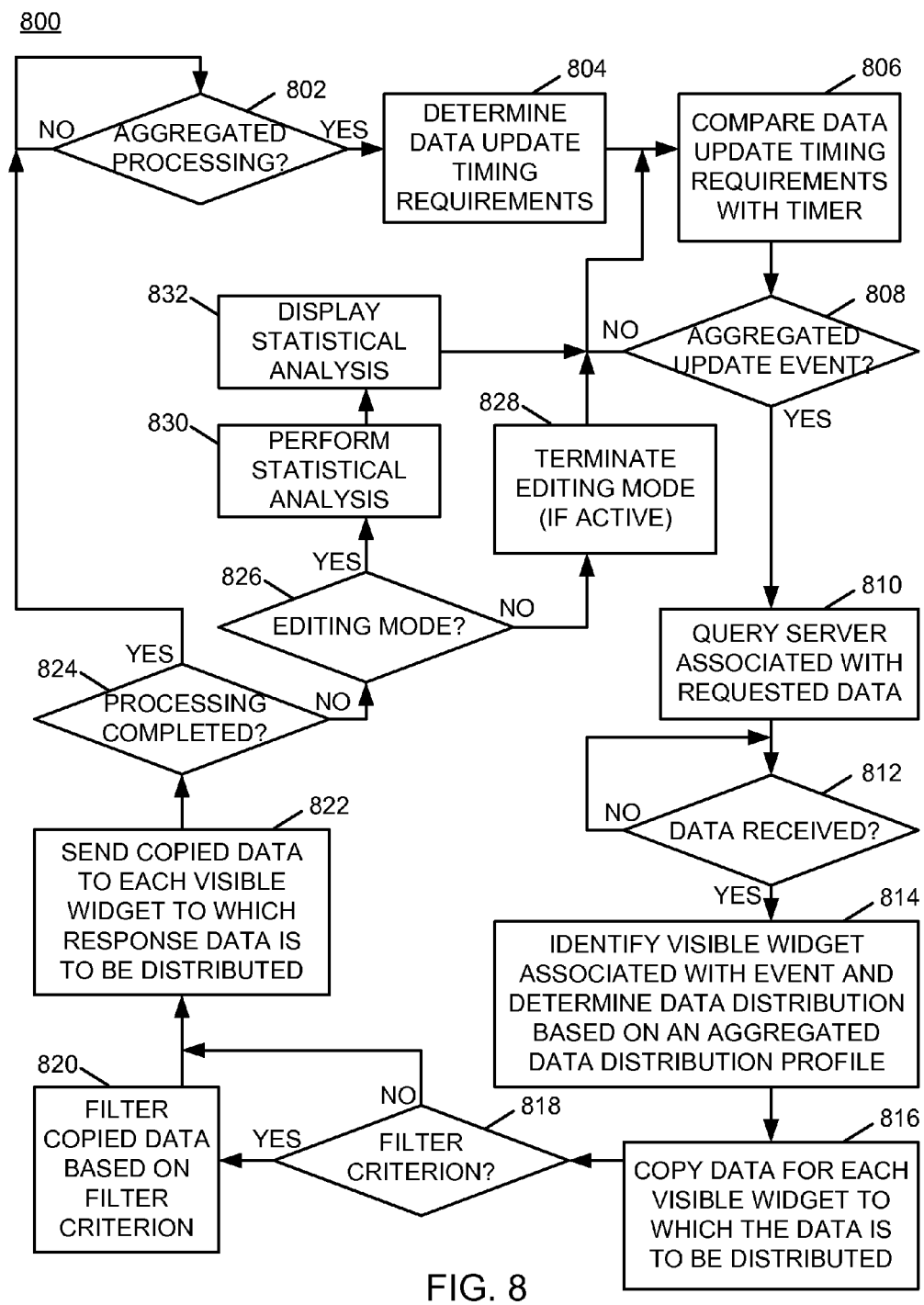
FIG. 8 is a flow chart of an example of an implementation of a process for performing aggregated widget request processing for registered visible widgets according to an embodiment of the present subject matter.

FIG. 6 through FIG. 8 below describe example processes that may be executed by devices, such as the computing device 102, to perform the automated aggregated widget request processing associated with the present subject matter. Many other variations on the example processes are possible and all are considered within the scope of the present subject matter. The example processes may be performed by modules, such as the aggregated widget request processing module 214 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 6 is a flow chart of an example of an implementation of a process 600 for automated aggregated widget request processing. At block 602, the process 600 registers, via an aggregated widget request processing module, each of a plurality of visible widgets for aggregated data request processing. At block 604, the process 600 determines that an aggregated data update event associated with at least one of the registered visible widgets has occurred. At block 606, the process 600 obtains data associated with the aggregated data update event from a server. At block 608, the process 600 distributes the data among the plurality of visible widgets based upon an aggregated data distribution profile.

FIG. 7 is a flow chart of an example of an implementation of a process 700 for registration of visible widgets for aggregated widget request processing. At decision point 702, the process 700 waits to receive a registration message. In response to determining that a registration message has been received, the process 700 obtains a data request event criterion and a data identifier from the received registration message at block 704. At decision point 706, the process 700 makes a determination as to whether the data request event criterion includes a periodic form of data request event criterion (e.g., a "Periodic" or an "onParPeriodic" data request event criterion). In response to determining that a periodic form data request event criterion has been received, the process 700 makes a determination at decision point 708 as to whether a timer has already been started. In response to determining that a timer has not been started, the process 700 starts a timer at block 710.

In response to determining that the received data request event criterion is not a periodic form of data request event criterion at decision point 706, or upon determining that a timer has already been started at decision point 708, or in response to starting the timer at block 710, the process 700 creates an aggregated data distribution profile (or updates a created aggregated data distribution profile for subsequent registrations within implementations that use a single combined aggregated data distribution profile) at block 712. The creation or update of the aggregated data distribution profile(s) is based upon the received data request event criterion and data identifier to register the visible widget associated with the received registration message for aggregated widget request processing. The process 700 returns to decision point 702 to await receipt of another register message. The process 700 iterates as described above for each registration message to register all visible widgets that request registration for aggregated widget request processing.

FIG. 8 is a flow chart of an example of an implementation of a process 800 for performing aggregated widget request processing for registered visible widgets. It is understood that the process 700 described above may be integrated into and form a portion of the process 800 without departure from the scope of the present subject matter to allow processing of aggregated data update event processing in conjunction with registering visible widgets for aggregated widget request processing. As such, the two processes are described as separate processes for ease of illustration purposes. Within the present example, it is assumed that a single combined aggregated data distribution profile is implemented, rather than a separate data distribution profile for each registered visible widget. It is understood that variations on the processing described may be implemented to support processing via multiple data distribution profiles, each associated with a registered visible widget.

At decision point 802, the process 800 makes a determination as to whether a request to begin aggregated widget request processing for visible widgets has been received. This determination may be made, for example, in response to registration of a first visible widget for aggregated widget request processing. At block 804, the process 800 determines data update timing requirements for any registered visible widgets. The determination of data update timing requirements may be made, for example, by identifying aggregated data update event criteria associated with an aggregated data distribution profile. The determination of data update timing requirements may include identifying a set of aggregated data update events as a subset of the data update requirements associated with each data request event criterion received from each of the registered visible widgets. An aggregated data update event processing schedule may be created that includes each of the plurality of aggregated data update events.

At block 806, the process 800 compares the data update timing requirements with a timer or clock module, such as the timer/clock module 216. As described above, the timer may include a single modulo timer used to service the data update timing requirements of all registered visible widgets.

At decision point 808, the process 800 makes a determination as to whether an aggregated data update event has occurred. Determining whether an aggregated data update event has occurred may include determining whether there is a match between the data update timing requirements and any aggregated data update event criteria within the aggregated distribution profile. Again, the aggregated data update event criteria may be based upon data request event criteria received from the registered visible widgets. Further, the determination of whether an aggregated data update event has occurred may further include comparing an aggregated data update event processing schedule with a timer, such as a timer associated with the timer/clock module 216, and determining that a match between one of the plurality of aggregated data update events and the timer has occurred. In response to determining that no aggregated data update event has occurred, the process 800 returns to block 806 to compare the data update timing requirements with the timer.

In response to determining that an aggregated data update event has occurred at decision point 808, the process 800 queries a server, such as the server_1 106, associated with the requested data at block 810. At decision point 812, the process 800 makes a determination as to whether the requested data has been received. In response to receipt of the requested data, the process 800 identifies the registered visible widget associated with the aggregated data update event and determines data distribution based upon the aggregated data distribution profile at block 814.

Determining the data distribution based upon the aggregated data distribution profile may include determining whether any registered visible widgets other that the identified registered visible widget associated with the aggregated data update event are registered to receive updates of the received data. Further, in response to determining that at least one other visible widget is registered to receive updates of the received data, a determination may be made as to whether any such widget is registered to be updated in association with updating the identified registered visible widget. As such, the received data may be distributed to the identified registered visible widget and to any other visible widget determined to be registered in association with updating the identified registered visible widget, such as via an "OnPar" data request event criterion.

At block 816, the process 800 copies the received data for each visible widget to which the received data is to be distributed. At decision point 818, the process 800 makes a determination as to whether the aggregated data distribution profile includes a filter criterion associated with any of the visible widgets to which the data is to be distributed. For example, a manager at a business establishment may be authorized to obtain and view secure and/or other private information associated with employees. However, other employees may not have authorized access to such information, and that information may be filtered prior to sending the copied data to a registered visible widget associated with a computing device of a regular employee. In such an implementation, a filtering determination may be made, for example, based upon employee identification such as a name or identification number.

In response to determining that at least one of the visible widgets to which the data is to be distributed has an associated filter criterion within the aggregated data distribution profile, the process 800 filters the copied data for any such visible widget based upon the identified filter criterion at block 820. In response to determining at decision point 818 that no filter criterion exists for any visible widget to which the data is to be distributed, or in response to filtering the copied data based upon any such filter criterion at block 820, the process 800 sends the copied data to each visible widget to which the data is to be distributed at block 822.

At decision point 824, the process 800 makes a determination as to whether aggregated widget request processing has been completed. In response to determining that aggregated widget request processing has not been completed, the process 800 makes a determination at decision point 826 as to whether a request to enter an editing mode associated with the aggregated widget request processing has been received. As described above, the editing mode provides message trace and statistical information on the aggregated widget request processing. In response to determining that a request to enter the editing mode associated with the aggregated widget request processing has been received at decision point 826, the process 800 performs statistical analysis on messaging at block 830. At block 832, the process 800 displays the results of the performed statistical analysis. The process 800 may return to block 806 and iterate as described above to process additional aggregated data update events.

Returning to the description of decision point 826, in response to determining that a request to enter the editing mode associated with the aggregated widget request processing has not been received, or for subsequent iterations if the editing mode was entered and a request to terminate the editing mode (not shown for brevity) has been received, the process 800 terminates the editing mode, if active, at block 828. In response to either terminating the editing mode at block 828 or as described above in response to displaying results of statistical analysis at block 832, the process 800 returns to block 806 and iterates as described above to process additional aggregated data update events. Returning to the description of decision point 824, in response to determining that aggregated data processing has been completed, the process 800 returns to decision point 802 to await a new request for aggregated data request processing.

As such, the process 800 determines that aggregated data update events associated with registered visible widgets have occurred and obtains data from one or more servers associated with the aggregated data update events. The process 800 distributes data received from the one or more servers among the registered visible widgets based upon an aggregated data distribution profile. The process 800 distributes the data within the present example by generating copies of the received data for each visible widget determined to be updated based upon the aggregated data distribution profile to allow each such visible widget to edit or further update the received data. However, it is understood that a process, such as the process 800, may alternatively allow the registered visible widgets access to the cached data copy received from the server if the registered visible widgets are not enabled to edit the cached data or where only one visible widget is registered to receive data, as appropriate for a given implementation. Filter criteria may be applied to the copied data or cached data, such as to remove employee information, such as secure or other private information, from the distributed data. Further, an editing mode is provided to generate statistics and trace information associated with aggregated request processing.

Figure 9:
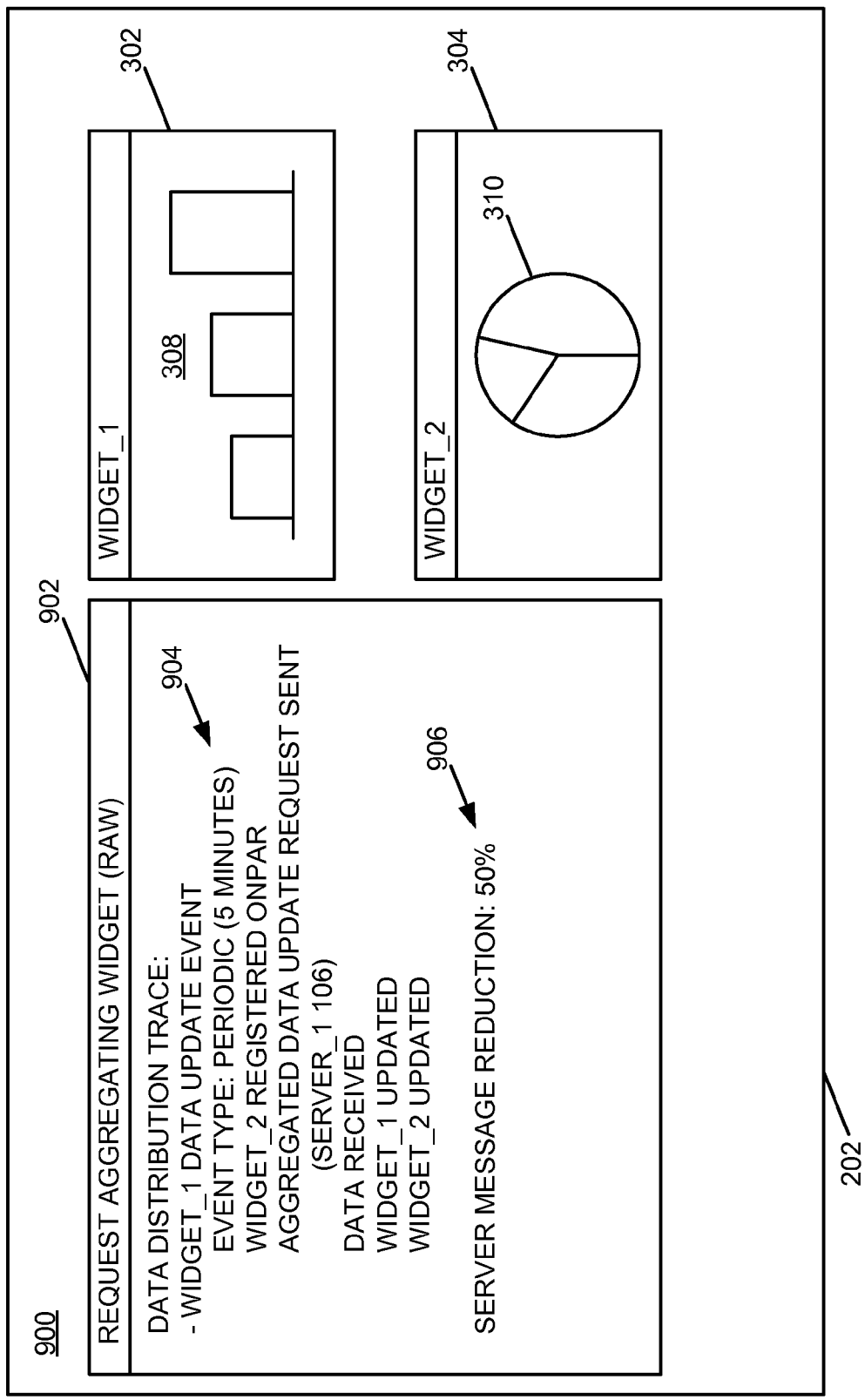
FIG. 9 is an illustration of an example of an implementation of a graphical user interface (GUI) that displays message trace and statistical analysis output in association with an editing mode for aggregated widget request processing according to an embodiment of the present subject matter.

FIG. 9 is an illustration of an example of an implementation of a graphical user interface (GUI) 900 that displays message trace and statistical analysis output in association with an editing mode for aggregated widget request processing. The example of FIG. 9 utilizes certain of the information processing described in associated with the aggregated widget request processing module 214 described in association with FIG. 3, FIG. 4, and FIG. 5 above. A request aggregating widget (RAW) analysis module 902 displays statistical information associated with the aggregated widget request processing module 214. The widget_1 302 and the widget_2 304 are again illustrated, as shown in FIG. 3, with the bar graph 308 and the pie chart 310, respectively. As such, the statistics provided within the present example are associated with aggregated widget request processing for the widget_1 302 and the widget_2 304.

As can be seen within the RAW analysis module 902, a data distribution trace area 904 identifies that an aggregated data update event associated with the widget_1 302 has occurred and that the event type is "Periodic" with a 5 minute interval. The data distribution trace area also shows that the widget_2 304 is registered as "OnPar" for the data requested in association with the widget_1 302. The data distribution trace area further shows that an aggregated data update request has been sent to the server_1 106, and that the requested data has been received. The data distribution trace area further shows that the widget_1 302 and the widget_2 304 have both been updated in response to receipt of the data. A server message reduction statistics area 906 shows that the aggregated widget request processing module 214 has reduced server messaging for this particular event by fifty percent (50%). As described above, by registering the widget_2 302 as "OnPar" for the same data with which the widget_1 302 is registered, the aggregated widget request processing module 214 may issue one data request query instead of two queries. As such, the server message reduction statistics area reflects this decrease in server messaging and network load, which correlates with an associated increase in efficiency.

As described above in association with FIG. 1 through FIG. 9, the example systems and processes provide aggregated widget request processing. Many other variations and additional activities associated with aggregated widget request processing are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   registering, via a processor, each of a plurality of visible widgets to receive aggregated server data updates using aggregated data request processing, where the aggregated data request processing comprises combining individual data updates specified during registrations of at least two visible widgets into single batch widget data update requests to servers;
   determining that an aggregated data update event associated with one of the at least two registered visible widgets has occurred, where the aggregated data update event is registered to obtain data to update data utilized by both of the at least two registered visible widgets in response to the aggregated data update event associated with the one of the at least two registered visible widgets;
   obtaining, via a single batch widget data update request to a server, data registered in association with the aggregated data update event from the server in response to the aggregated data update event associated with the one of the at least two registered visible widgets; and
   distributing the obtained data to both of the at least two registered visible widgets based upon an aggregated data distribution profile that specifies the at least two registered visible widgets that are registered to receive the obtained data in response to the aggregated data update event associated with the one of the at least two registered visible widgets.

2. The method of claim 1, where registering, via the processor, each of the plurality of visible widgets to receive the aggregated server data updates using the aggregated data request processing comprises:
   receiving a registration message comprising a data request event criterion and a data identifier from each of the plurality of visible widgets; and
   creating the aggregated data distribution profile based upon the data event request criterion and the data identifier received from each of the plurality of visible widgets.

3. The method of claim 2, where determining that the aggregated data update event associated with the one of the at least two registered visible widgets has occurred comprises:
   determining data update requirements associated with each data request event criterion received from each of the plurality of registered visible widgets;
   identifying a plurality of aggregated data update events as a subset of the data update requirements associated with each data request event criterion received from each of the plurality of registered visible widgets;
   creating an aggregated data update event processing schedule comprising each of the plurality of aggregated data update events;
   comparing the aggregated data update event processing schedule with a timer associated with the processor; and
   determining that a match between one of the plurality of aggregated data update events and the timer has occurred.

4. The method of claim 2, where the data request event criterion associated with each of the plurality of visible widgets comprises a criterion selected from a group consisting of:
   a periodic data update criterion that specifies a periodicity of data update;
   an on-par update criterion that specifies another visible widget from which to utilize data updates;
   a share update criterion that specifies that other visible widgets may utilize updated data; and
   an on-par periodic update criterion that specifies both the periodicity of data update and another visible widget from which to utilize the data updates.

5. The method of claim 1, further comprising identifying the one of the at least two registered visible widgets with which the aggregated data update event is associated, and where distributing the obtained data to both of the at least two registered visible widgets based upon the aggregated data distribution profile that specifies the at least two visible widgets that are registered to receive the obtained data in response to the aggregated data update event associated with the one of the at least two registered visible widgets comprises:
   distributing the obtained data to the identified one of the at least two registered visible widgets;
   determining, based upon the aggregated data distribution profile, whether another of the plurality of registered visible widgets is registered to receive updates of the data; and
   in response to determining that at least one other of the at least two registered visible widgets is registered to receive updates of the obtained data, distributing the obtained data to the at least one other of the at least two registered visible widgets registered to be updated in association with updating the identified one of the at least two registered visible widgets.

6. The method of claim 1, where distributing the obtained data to both of the at least two registered visible widgets based upon the aggregated data distribution profile that specifies the at least two registered visible widgets that are registered to receive the obtained data in response to the aggregated data update event associated with the one of the at least two registered visible widgets comprises, for each of the at least two registered visible widgets to which the obtained data is to be distributed:
  copying the obtained data for each of the at least two registered visible widgets to which the obtained data is to be distributed; and
  sending the copied data to each of the at least two registered visible widgets to which the obtained data is to be distributed.

7. The method of claim 1, further comprising:
determining whether the aggregated data distribution profile comprises at least one filtering criterion for at least one of the at least two registered visible widgets to which the obtained data is to be distributed; and
filtering the obtained data for the at least one of the at least two registered visible widgets to which the obtained data is to be distributed in response to determining that the aggregated data distribution profile comprises the at least one filtering criterion.

8. The method of claim 1, further comprising:
receiving a request for statistics associated with the aggregated data request processing;
performing statistical analysis of the aggregated data request processing; and
providing results of the statistical analysis in response to the request for statistics.

9. A system, comprising:
a communication module; and
a processor programmed to:
  register each of a plurality of visible widgets to receive aggregated server data updates using aggregated data request processing, where the aggregated data request processing comprises combining individual data updates specified during registrations of at least two visible widgets into single batch widget data update requests to servers;
  determine that an aggregated data update event associated with one of the at least two registered visible widgets has occurred, where the aggregated data update event is registered to obtain data to update data utilized by both of the at least two registered visible widgets in response to the aggregated data update event associated with the one of the at least two registered visible widgets;
  obtain, via a single batch widget data update request to a server, data registered in association with the aggregated data update event from the server via the communication module in response to the aggregated data update event associated with the one of the at least two registered visible widgets; and
  distribute the obtained data to both of the at least two registered visible widgets based upon an aggregated data distribution profile that specifies the at least two registered visible widgets that are registered to receive the obtained data in response to the aggregated data update event associated with the one of the at least two registered visible widgets.

10. The system of claim 9, where, in being programmed to register each of the plurality of visible widgets to receive the aggregated server data updates using the aggregated data request processing, the processor is programmed to:
  receive a registration message comprising a data request event criterion and a data identifier from each of the plurality of visible widgets; and
  create the aggregated data distribution profile based upon the data event request criterion and the data identifier received from each of the plurality of visible widgets.

11. The system of claim 10, further comprising:
a timer; and
where in being programmed to determine that the aggregated data update event associated with the one of the at least two registered visible widgets has occurred, the processor is programmed to:
  determine data update requirements associated with each data request event criterion received from each of the plurality of registered visible widgets;
  identify a plurality of aggregated data update events as a subset of the data update requirements associated with each data request event criterion received from each of the plurality of registered visible widgets;
  create an aggregated data update event processing schedule comprising each of the plurality of aggregated data update events;
  compare the aggregated data update event processing schedule with the timer; and
  determine that a match between one of the plurality of aggregated data update events and the timer has occurred.

12. The system of claim 10, where the data request event criterion associated with each of the plurality of visible widgets comprises a criterion selected from a group consisting of:
  a periodic data update criterion that specifies a periodicity of data update;
  an on-par update criterion that specifies another visible widget from which to utilize data updates;
  a share update criterion that specifies that other visible widgets may utilize updated data; and
  an on-par periodic update criterion that specifies both the periodicity of data update and another visible widget from which to utilize the data updates.

13. The system of claim 9, where the processor is further programmed to identify the one of the at least two registered visible widgets with which the aggregated data update event is associated, and where, in being programmed to distribute the obtained data to both of the at least two registered visible widgets based upon the aggregated data distribution profile that specifies the at least two visible widgets that are registered to receive the obtained data in response to the aggregated data update event associated with the one of the at least two registered visible widgets, the processor is programmed to:
  distribute the obtained data to the identified one of the at least two registered visible widgets;
  determine, based upon the aggregated data distribution profile, whether another of the plurality of registered visible widgets is registered to receive updates of the data; and
  in response to determining that at least one other of the at least two registered visible widget widgets is registered to receive updates of the obtained data, distribute the obtained data to the at least one other of the at least two registered visible widgets registered to be updated in association with updating the identified one of the at least two registered visible widgets.

14. The system of claim 9, where, in being programmed to distribute the obtained data to both of the at least two registered visible widgets based upon the aggregated data distribution profile that specifies the at least two registered visible widgets that are registered to receive the obtained data in response to the aggregated data update event associated with the one of the at least two registered visible widgets, the processor is programmed to, for each of the at least two registered visible widgets to which the obtained data is to be distributed:

copy the obtained data for each of the at least two registered visible widgets to which the obtained data is to be distributed; and send the copied data to each of the at least two registered visible widgets to which the obtained data is to be distributed.

15. The system of claim 9, where the processor is further programmed to:

determine whether the aggregated data distribution profile comprises at least one filtering criterion for at least one of the at least two registered visible widgets to which the obtained data is to be distributed; and filter the obtained data for the at least one of the at least two registered visible widgets to which the obtained data is to be distributed in response to determining that the aggregated data distribution profile comprises the at least one filtering criterion.

16. The system of claim 9, where the processor is further programmed to:

receive a request for statistics associated with the aggregated data request processing;

perform statistical analysis of the aggregated data request processing; and provide results of the statistical analysis in response to the request for statistics.

17. A computer program product comprising a computer readable storage device including computer readable program code, where the computer readable program code when executed on a computer causes the computer to:

register, via an aggregated widget request processing module, each of a plurality of visible widgets to receive aggregated server data updates using aggregated data request processing, where the aggregated data request processing comprises combining individual data updates specified during registrations of at least two visible widgets into single batch widget data update requests to servers;

determine that an aggregated data update event associated with one of the at least two registered visible widgets has occurred, where the aggregated data update event is registered to obtain data to update data utilized by both of the at least two registered visible widgets in response to the aggregated data update event associated with the one of the at least two registered visible widgets;

obtain, via a single batch widget data update request to a server, data registered in association with the aggregated data update event from the server in response to the aggregated data update event associated with the one of the at least two registered visible widgets; and distribute the obtained data to both of the at least two registered visible widgets based upon an aggregated data distribution profile that specifies the at least two registered visible widgets that are registered to receive the obtained data in response to the aggregated data update event associated with the one of the at least two registered visible widgets.

18. The computer program product of claim 17, where, in causing the computer to register, via the aggregated widget request processing module, each of the plurality of visible widgets to receive the aggregated server data updates using the aggregated data request processing, the computer readable program code when executed on the computer causes the computer to:

receive a registration message comprising a data request event criterion and a data identifier from each of the plurality of visible widgets; and create the aggregated data distribution profile based upon the data event request criterion and the data identifier received from each of the plurality of visible widgets.

19. The computer program product of claim 18, where, in causing the computer to determine that the aggregated data update event associated with the one of the at least two registered visible widgets has occurred, the computer readable program code when executed on the computer causes the computer to:

determine data update requirements associated with each data request event criterion received from each of the plurality of registered visible widgets;

identify a plurality of aggregated data update events as a subset of the data update requirements associated with each data request event criterion received from each of the plurality of registered visible widgets;

create an aggregated data update event processing schedule comprising each of the plurality of aggregated data update events;

compare the aggregated data update event processing schedule with a timer; and determine that a match between one of the plurality of aggregated data update events and the timer has occurred.

20. The computer program product of claim 18, where the data request event criterion associated with each of the plurality of visible widgets comprises a criterion selected from a group consisting of:

a periodic data update criterion that specifies a periodicity of data update;

an on-par update criterion that specifies another visible widget from which to utilize data updates;

a share update criterion that specifies that other visible widgets may utilize updated data; and an on-par periodic update criterion that specifies both the periodicity of data update and another visible widget from which to utilize the data updates.

21. The computer program product of claim 17, where the computer readable program code when executed on the computer further causes the computer to identify the one of the at least two registered visible widgets with which the aggregated data update event is associated, and where, in causing the computer to distribute the obtained data to both of the at least two registered visible widgets based upon the aggregated data distribution profile that specifies the at least two visible widgets that are registered to receive the obtained data in response to the aggregated data update event associated with the one of the at least two registered visible widgets, the computer readable program code when executed on the computer causes the computer to:

distribute the obtained data to the identified one of the at least two registered visible widgets;

determine, based upon the aggregated data distribution profile, whether another of the plurality of registered visible widgets is registered to receive updates of the data; and in response to determining that at least one other of the at least two registered visible widgets is registered to receive updates of the obtained data, distribute the obtained data to the at least one other of the at least two registered visible widgets registered to be updated in association with updating the identified one of the at least two registered visible widgets.

22. The computer program product of claim 17, where, in causing the computer to distribute the obtained data to both of the at least two registered visible widgets based upon the aggregated data distribution profile that specifies the at least two registered visible widgets that are registered to receive the obtained data in response to the aggregated data update event associated with the one of the at least two registered visible widgets, the computer readable program code when executed on the computer causes the computer to, for each of the at least two registered visible widgets to which the obtained data is to be distributed:
- copy the obtained data for each of the at least two registered visible widgets to which the obtained data is to be distributed; and
- send the copied data to each of the at least two registered visible widgets to which the obtained data is to be distributed.

23. The computer program product of claim 17, where the computer readable program code when executed on the computer further causes the computer to:
- determine whether the aggregated data distribution profile comprises at least one filtering criterion for at least one of the at least two registered visible widgets to which the obtained data is to be distributed; and
- filter the obtained data for the at least one of the at least two registered visible widgets to which the obtained data is to be distributed in response to determining that the aggregated data distribution profile comprises the at least one filtering criterion.

24. The computer program product of claim 17, where the computer readable program code when executed on the computer further causes the computer to:
- receive a request for statistics associated with the aggregated data request processing;
- perform statistical analysis of the aggregated data request processing; and
- provide results of the statistical analysis in response to the request for statistics.

* * * * *